Sept. 18, 1945.　　　　J. M. DODWELL　　　　2,384,820
SEED PLANTING MACHINE
Filed March 6, 1943　　　　5 Sheets-Sheet 1

INVENTOR
JOHN M. DODWELL
by Fetherstonhaugh & Co.
ATTORNEYS

Sept. 18, 1945.  J. M. DODWELL  2,384,820
SEED PLANTING MACHINE
Filed March 6, 1943  5 Sheets-Sheet 2

INVENTOR
JOHN. M. DODWELL
BY Fetherstonhaugh & Co
ATTORNEYS

Sept. 18, 1945.   J. M. DODWELL   2,384,820
SEED PLANTING MACHINE
Filed March 6, 1943   5 Sheets-Sheet 3

FIG.4

INVENTOR
JOHN.M.DODWELL
BY Fetherstonhaugh & Co.
ATTORNEYS

Sept. 18, 1945.  J. M. DODWELL  2,384,820
SEED PLANTING MACHINE
Filed March 6, 1943   5 Sheets-Sheet 4

INVENTOR
JOHN. M. DODWELL
by Fetherstonhaugh & Co.
ATTORNEYS

FIG. 8

INVENTOR
JOHN. M. DODWELL
ATTORNEYS

Patented Sept. 18, 1945

2,384,820

UNITED STATES PATENT OFFICE 2,384,820

SEED PLANTING MACHINE

John M. Dodwell, Shawbridge, Quebec, Canada

Application March 6, 1943, Serial No. 478,285

18 Claims. (Cl. 222—11)

This invention relates to improvements in pneumatic seed planting machines in which individual seeds or groups of seeds are separated from a mass of seeds and delivered, at regularly recurring intervals, to a seed dropping spout by a rotating, suction type seed pick-up ring. Previously proposed planting machines of this type have, for one reason or another, failed to achieve commercial success despite the soundness of the principles involved in the construction and operation thereof. In most cases such failure may be attributed to faulty design, rendering such machines either too complicated and expensive to build or too inefficient and unreliable in operation.

The present invention provides a pneumatic seed planting machine which may be built and maintained in good working order at moderate cost, is efficient and reliable in operation, and may be adjusted to meet a wide range of requirements as regards variations in the kind, size or spacing of the seeds which are to be planted. This is achieved by providing a machine in which the component parts are constructed and assembled in a novel manner as hereinafter explained in connection with the accompanying drawings, in which—

The planting machine shown in the present drawings includes a rotatably mounted casing 5 adapted to be propelled along the ground and rotated by contact therewith. This casing comprises a ground engaging rim 6 and two centrally apertured side plates 7 and 8.

Plate 7 is provided with a relatively large central aperture 9 and is mounted to turn about a non-rotating disk 10 fitted in said aperture. In this connection it will be noted that plate 7 is equipped with supporting rollers 11 which travel on the peripheral edge portion 12 of disk 10. Each roller 11 is fitted in a recess 13 of plate 7 (Figs. 1 and 4) and rotates about a bushing 14 which is secured to a plate 15 by screw bolt 16 and nut 17. The roller carrying plate 15 overlies the outer side of the recess 13 and is secured to plate 7 by screws 18 or other suitable fastening means. Plate 8 is provided with a central aperture 20 which is partially closed at the inner side of said plate by a bearing ring 21, the outer marginal portion of which is secured to said plate by bolts 22 and nuts 23 or by any other suitable form of fastening means. The inner edge of ring 21 bears against the bottom wall of an annular channel 24 formed between a pair of rings 25 and 26 which are secured together by screws 27 or other suitable fastening means. Ring 25 is rigidly secured to one end of a hollow tubular shaft 29 and is provided, inwardly of its outer edge, with an integral annular projection 30 which abuts the ring 26 and forms the bottom wall of said channel. A perforated cap member 31 is rigidly secured in that end of shaft 29 which carries the bearing rings 25 and 26 and a plurality of air inlet openings 32 are provided in a wall portion of the shaft located immediately adjacent said cap member. The opposite end of shaft 29 is tightly fitted in a circular recess 33 provided in the central portion of the inner side of the previously mentioned disk 10. Shaft 29 is also rigidly secured to disk 10 by a plurality of draw bolts 34 having their head ends countersunk in the outer side of disk 10 and their opposite ends threadedly engaged with suitable threaded openings (not shown) provided in the cap member 31.

From the foregoing it will be seen that disk 10, bearing rings 25 and 26, shaft 29, and cap member 31 are rigidly fastened together and constitute a non-rotating supporting structure about which casing 5 rotates when the rim 6 is propelled along the ground by a handle member 35 which is attached to the non-rotating disk as hereinafter described. In the present instance I have shown the rim 6 and plates 7 and 8 of casing 5 detachably fastened together by fastening plates 36 and screws 37. However, it will be understood that the rim 6 and plate 7 may be formed and assembled in any suitable manner which will enable access to be obtained to the interior parts of the machine whenever necessary or desirable.

A diagonally inclined seed spout 38 is arranged so that it extends through suitable openings 39, 40 and 41 provided, respectively, in the lower portion of disk 10, in the lower wall portion of shaft 29, and in the upper portion of cap member 31. The spout 38 is preferably inclined at an angle of approximately 45° and is open at both ends, the upper end being positioned within the central aperture 20 of plate 8 and the lower end being projected beyond the outer side of disk 10 and bent downwardly as indicated at 38a.

A circular suction chamber 43, made of sheet metal or any other suitable material, is fitted in the central aperture 20 of plate 8 and is fastened to bearing ring 21 by screw bolts 44 or any other suitable manner. The inner peripheral wall 45 of chamber 43 is spaced a substantial distance from the upper end of spout 38 and is stepped to provide an outwardly facing shoulder 46 which is offset inwardly with reference to the outer side wall 46a of said chamber. That portion of wall 45 which lies inwardly of the shoulder portion 46 is interrupted by a continuous annular slot 47 located immediately adjacent said shoulder forming portion. The slot 47 provides a communicating suction passage between the interior of chamber 43 and the space bounded by the slotted wall 45.

The outer peripheral wall 48 of chamber 43 is provided with an opening 49 placing the interior of said chamber in communication with one end of an air flow passage 50 provided in a filter casing 51 which is fastened to the outer side of plate 8 in any suitable manner. Casing 51 is provided with a baffle 52 which lies between the air passage 50 and a second air passage 52a so that these two passages are in communication with each other only at the ends thereof remote from the opening 49. Passage 52a is provided with an air outlet opening 53 placing same in communication with a suction box 54 and is provided with an inclined screen 55 arranged so that all air flowing from passage 52a to suction box 54 must pass through this screen and be thereby freed of dirt, chaff, or other foreign matter. The end of casing 51 remote from suction chamber 43 is equipped with a hinged cover 56 which is normally held in closed position by a releasable spring latch device 57 or any other type of securing means.

That wall of air passage 50 which lies opposite baffle 52 is provided with a supplementary air admission opening 56a controlled by an inwardly opening automatic valve 57. In the present instance valve 57 is shown as a disk fixed to a screw bolt 58 which extends outwardly through opening 56a and through a bridging member 59 spanning said opening. A valve regulating spring 60 is arranged on the screw bolt 58 between the bridging member 59 and a rotatable finger piece 61 which is threaded onto the outer portion of screw bolt 58. By turning the finger piece 61 the compression of spring 60 may be regulated so that the valve 57 will open against the resistance of said spring only when a predetermined suction is created in air passage 50 by the suction producing means hereinafter described. The finger piece 61 is provided with a calibrated scale 62 which serves, in conjunction with the indicator 63, to facilitate the adjustment of spring 60 so that valve 57 may be set to open in response to a predetermined reduction of pressure in air passage 50.

Trough forming plates 65 are arranged in casing 51 to provide troughs 66 at opposite sides of the outer end of baffle 52. These troughs serve to trap a considerable amount of dirt, chaff and other foreign material entrained by the air which flows through the air passages 50 and 52a from the suction chamber 43 to the suction box 54. During rotation of the machine the heavier particles of foreign material are separated from the air stream and thrown outwardly toward and into the troughs by centrifugal force as the air stream reverses its direction of flow in passing from the passage 50 to the passage 52a.

Figure 6:
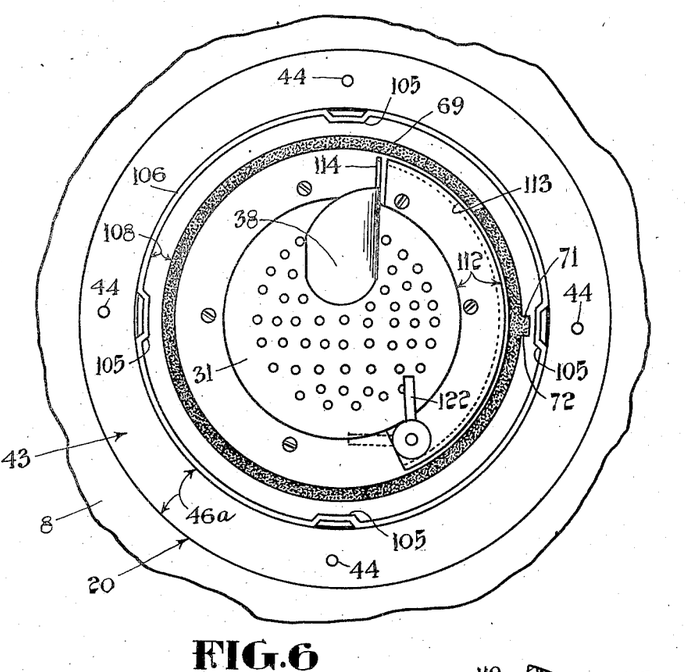
Fig. 6 is a fragmentary view of the seed container side of the machine as it appears with the seed container removed.

A removable seed pick-up or carrying ring 69 is fitted against the bearing ring 26 so that the outer peripheral surface of the seed carrying ring is in sealing contact with the slotted wall 45 of suction chamber 43. The seed carrying ring 69 is preferably made of flexible and elastic material such as rubber and is provided with a circular series of suction ports 70 which are spaced a predetermined distance apart and are in line with the slot 47 of suction chamber 43. The openings 70 are preferably conical openings having their smaller ends directed inwardly toward the central axis of the seed carrying ring. A key 71 (see Figs. 4 and 6) is formed on the outer side of the seed carrying ring 69 and is fitted in a key slot 72 provided in the wall 45 of suction chamber 43. It will thus be seen that seed carrying ring 69 is keyed to the suction chamber 43 to rotate therewith around the upper end of spout 38. The outer diameter of the flexible and elastic ring 69 is slightly larger than the inner diameter of the suction chamber wall 45 so that a slight deformation of the ring by flexure is necessary to permit it to be fitted in place or removed. The larger diameter of the elastic ring in relation to the suction chamber wall 45 ensures sufficient pressure contact between the engaging surfaces of these parts to provide an effective seal against leakage of air.

A plurality of bellows-type suction pumps 75 are mounted on the suction box 54, each pump being provided with air intake openings 76 which communicate with the interior of suction box 54 and are controlled by a flap valve 77. Each pump 75 is also provided with air outlet openings 78 controlled by a flap valve 79. The top or movable portions of the several pumps 75 are operated by a crank shaft 80 through the agency of the cranks 81 and connecting rods 82. The end portions of shaft 80 are journalled in suitable bearings 83 carried by a frame structure 84 which is fastened to the inner side of plate 8 and carries the suction box 54 and the pumps 75. A chain sprocket 86 is loosely mounted on the end of the crank shaft 80 which is located adjacent the plate 7 of casing 5 and is clutched to said shaft by a free wheeling clutch 87 when casing 5 is rotated in one direction relative to the stationary structure comprising the disk 10 and hollow shaft 29. The free wheeling clutch 87 may be of any desired construction but I prefer to employ a free wheeling clutch construction in accordance with the principles set forth in my co-pending application Serial No. 414,024 filed Oct. 7, 1941. The relative angular displacement of the several cranks 81 should be such that the pumps operate in suitable sequence to maintain a continuous suction through the suction box 54, the filter casing 51, and the suction chamber 43.

Figure 5:
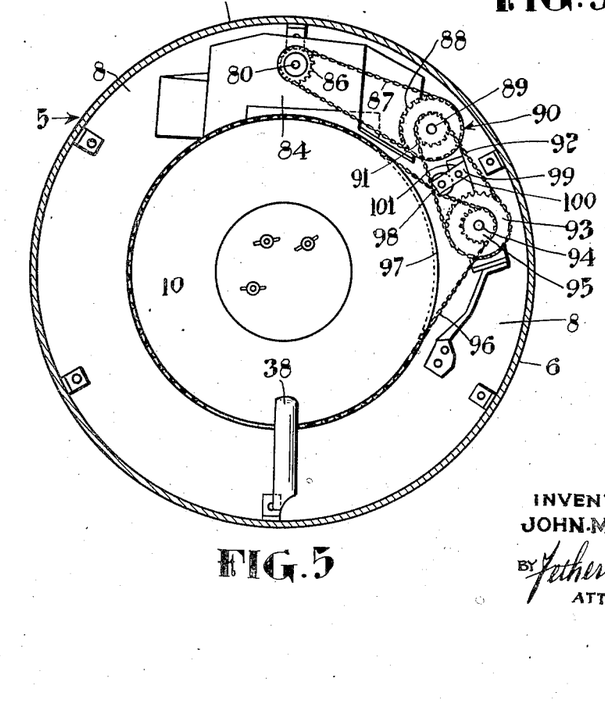
Fig. 5 is a sectional view taken substantially along the section line 5—5 of Fig. 4, except that certain parts which would ordinarily appear in section are shown in elevation to facilitate a better understanding of the invention.

The sprocket 86 (see Fig. 5) is driven by a chain 87 from a sprocket 88 mounted on a shaft 89 which is supported by a suitable frame structure 90 fastened to the inner side of plate 8. Shaft 89 also carries a small sprocket 91 which is driven by chain 92 from a large sprocket 93 mounted on a shaft 94 journalled in the frame structure 90. Shaft 94 carries a small sprocket 95 which is driven by a chain 96 which is trained around the disk 10 in driving engagement with sprocket teeth 97 carried by said disk. A chain tightening pulley 98 is journalled in a pulley carrier 99 which is pivoted to the frame structure 90 as indicated at 100. A biasing spring 101 is suitably arranged to swing the pulley carrier 99 about its pivot 100 so that the pulley 98 is pressed against the driving chain 96 and serves to tighten the latter so that it will not jump the sprocket teeth 97 of disk 10.

The seeds to be planted are delivered onto the lower inner peripheral portion of the seed pick-up or carrying ring 69 from a seed container 103 which is preferably transparent and may be made of glass, plastics, or other suitable transparent material. The container 103 is provided with an interrupted screw thread (not shown) by means of which the open end or mouth portion of the container is threadedly engaged with the lugs or projections 105 of a container supporting ring 106. Ring 106 is permanently secured to the suction chamber 43 to rotate therewith and is provided with a flanged portion 107 which is butted against the outwardly facing shoulder 46 of the suction chamber. The outer face of the flanged portion 107 of ring 106 is covered by a rubber sealing ring 108 which makes sealing contact with the mouth of the container 103 when the latter is screwed home against said sealing ring. The body wall of container 103 is formed with internal spirally or helically curved feeding ribs 110 by means of which the seeds within said container are fed onto the inner peripheral portion of the pick-up ring 69 when the machine is in operation.

Figure 1:
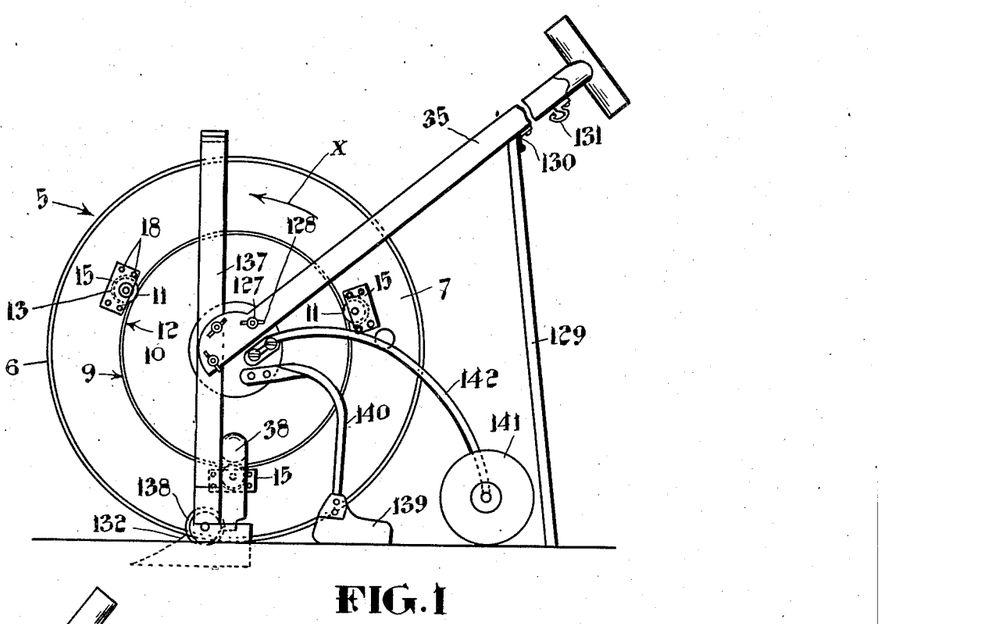
Fig. 1 is a side elevation of a seed planting machine constructed in accordance with my invention.
Figure 2:
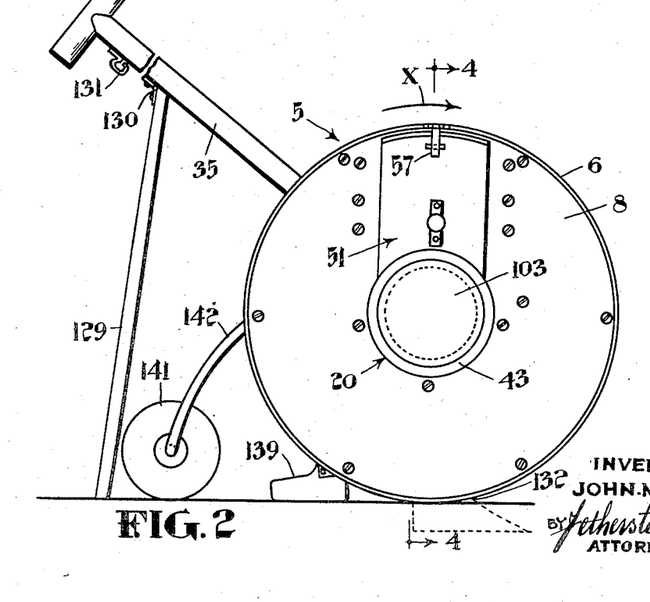
Fig. 2 is a side elevation of the machine as it appears when looking toward the side opposite that shown in Fig. 1.

When the machine described herein is propelled forwardly by the handle member 35 the ground engaging casing 5 is rotated in the direction indicated by the arrow X in Figs. 1 and 2 and carries with it all those parts of the seed feeding mechanism which are carried by the plate 8, such parts including the suction pumps 75 and suction box 54, casing 51, suction chamber 43, bearing ring 21, seed pick-up ring 69, the container supporting ring 106 and the container 103. The remaining parts comprising the disk 10, hollow shaft 29, seed spout 28, bearing rings 25 and 26, and cap member 31 are held against rotation by reason of their attachment to the handle member 35.

Figure 7:
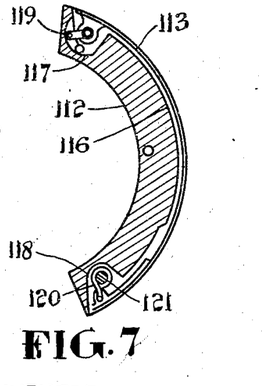
Fig. 7 is a sectional view of a shoe which constitutes part of the assembly shown in Fig. 6.
Figure 8:
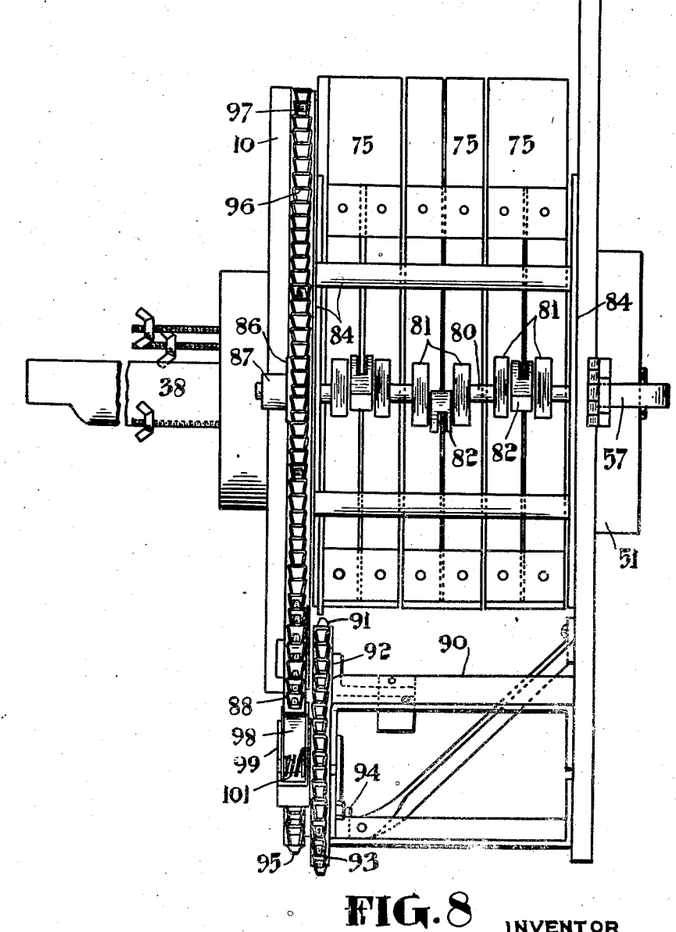
Fig. 8 is a plan view of the machine as it appears when the rim and one side portion of the rotatable end is removed.

As the container 103 is turned about its horizontal axis the spirally or helically curved ribs 110 serve to feed the seeds from said container onto the lower portion of the peripheral surface of the revolving pick-up ring 69. A curved shoe holder 112 is fastened to the stationary cap member 31 so that said holder is positioned relatively close to that portion of the inner periphery of the pick-up ring 69 which is travelling downwardly during the planting operation. This shoe holder is equipped with a movable shoe 113 which, in the outwardly projecting position shown in Fig. 7, engages the inner surface of the descending portion of the ring 69 and thus serves to block the inner ends of the descending suction ports 70. From this it will be seen that the space surrounded by the pick-up ring 69 is placed in communication with the suction chamber 43 only through those suction ports 70 which, at any given time, are travelling upwardly from the lower end of the shoe holder 112 to a point directly above the upper end of spout 38. A scraper 114 is arranged between the upper end of spout 38 and the pick-up ring 69 so that there is only a slight clearance between the upper edge of the scraper and the inner periphery of the pick-up ring.

As each suction port 70 passes beyond the lower end of the shoe holder 112 air is sucked therethrough by the suction pumps 75 and causes an individual seed to be sucked against the inner end of said port and to be held there until the port travels upwardly to a point where the seed is scraped from the ring by the scraper 114 and caused to drop into the feed spout 38 through which the seed is deposited upon the ground.

Air is admitted to the space bounded by the pick-up ring 69 through the shaft openings 32 and the perforated cap member 31 and prevents the creation of an absolute vacuum in said space. The setting of the automatic suction regulating valve 57 which controls the admission of air to the air passage 50 regulates the maximum degree of suction created in the suction ports 70 of the pick-up ring. By appropriate setting of the valve 57, the suction created in each of the suction ports 70 of pick-up ring 69 may be adjusted to suit the size and/or weight of the seed being planted.

In the present instance the shoe holder 112 is shown provided with a peripheral groove 116 and communicating recesses 117 and 118. The upper end of the shoe 113 is fastened to the shoe holder by a shackle 119 working in the recess 117. The lower end of the shoe is fastened to one end of a spring 120 which is wound about a rotary shaft 121 extending through the recess 118, the other end of said spring being passed through a transverse slot provided in said shaft. One end of the shaft 121 is projected beyond the shoe holder 112 and is fitted with a handle member 122. When this handle member is turned to the dotted line position shown in Fig. 6 the spring 120 is unwound and causes the shoe 113 to be projected outwardly under slight spring tension against the inner peripheral surface of the pick-up ring 69 thereby blocking or closing off the inner ends of the descending suction ports 70 of said ring. When the handle 122 is moved from the dotted to the full line position shown in Fig. 6 the spring 120 is wound on shaft 121 and causes the shoe 113 to be retracted to an inoperative position in which it is received within the groove 116.

Figure 4:
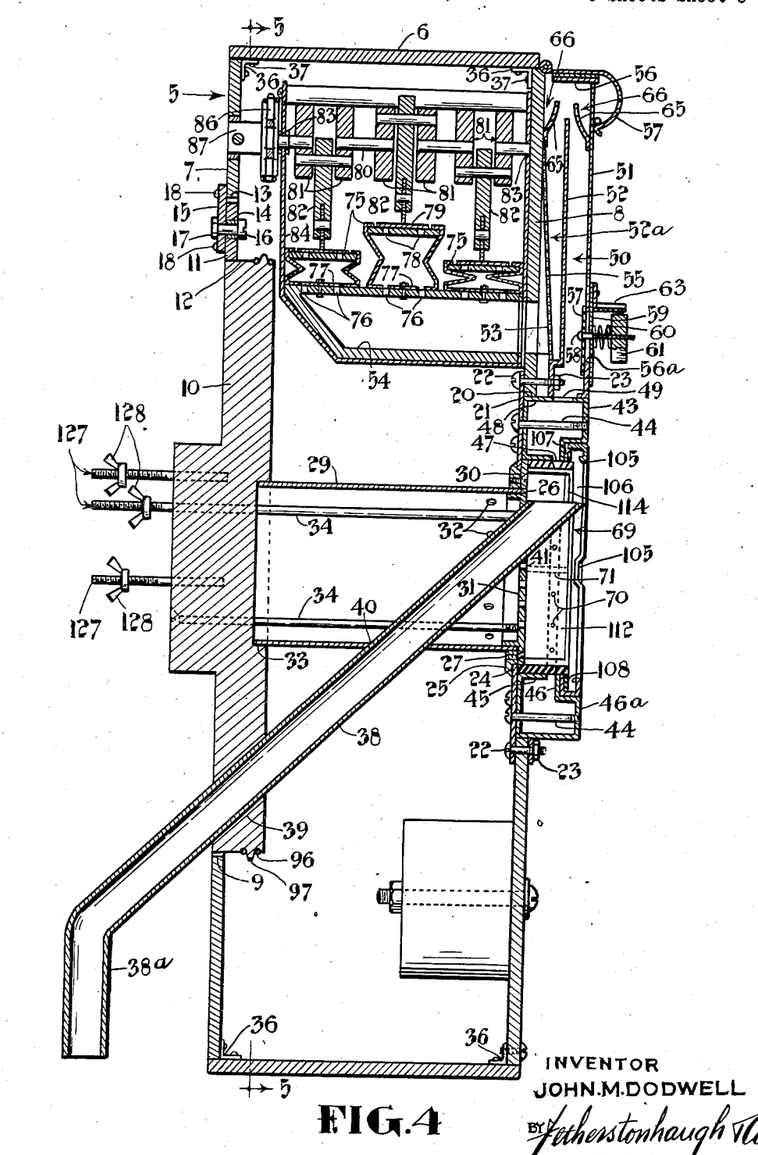
Fig. 4 is a vertical transverse sectional view taken substantially along the line 4—4 of Fig. 2, certain parts that would otherwise appear in Fig. 4 being omitted for the sake of clearness.
Figures 9, 11:
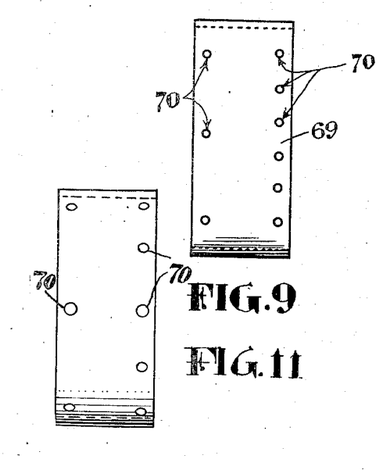
Figs. 9 to 11 inclusive are views illustrating alternative forms of interchangeable and reversible seed pick-up rings adapted to be used with said machine.

An important feature of the invention consists in the provision of a plurality of interchangeable pick-up rings 69, each of which is provided with suction ports which are of a different size or are differently arranged as compared with the remaining rings. For example the ring 69 shown in Fig. 4 is provided with a single row of suction ports spaced a predetermined distance apart. When this type of ring is used it serves to feed individual seeds to the feed spout at regularly recurring intervals predetermined by the spacing of the suction ports. The pick-up ring 69 shown in Fig. 9 is provided with two rows of suction ports 70 arranged so that the ports of one row are spaced apart a different distance as compared with the ports of the companion row. When the pick-up ring is provided with two rows of suction ports it is preferred that the spacing of the ports of one row be twice as great as the spacing of the ports of the companion row but this is not essential as any other desired relation between the spacing of the ports of the two rows may be resorted to. The ring shown in Fig. 9 is reversible so that it may be inserted in place so that the ports of either row will be in alignment with the slot 47 of suction chamber 43.

Figure 10:
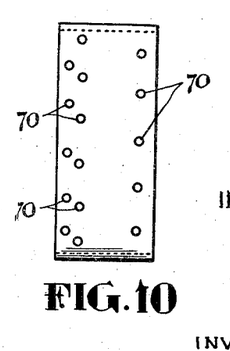

In Fig. 10 I have shown a further type of ring in which a single row of widely spaced suction ports 79 are provided adjacent one side of the ring while other suction ports 70 are arranged in pairs adjacent the opposite side of the ring so that those ports which are paired together adjacent one edge of the ring are staggered with reference to the ports located adjacent the opposite edge of the ring. This last mentioned type of ring may be fitted in place so that all those ports which are paired together adjacent one edge of the ring will be in line with slot 47 of suction chamber 43. In this case each pair of suction ports serves to pick-up two seeds which are delivered to the feed spout 38 in such close succession that they will be planted together. The last mentioned ring may also be inserted in place in a reverse position in which, the single row of ports adjacent one edge of said ring are in line with the slot 47 of the suction chamber. These different designs of rings are mentioned merely by way of illustrating some of the many different types of pick-up rings which may be provided to adapt the machine for the planting of seeds either singly or in group at various predetermined intervals. The size of the suction ports 70 provided in the pick-up ring will depend upon the type of seeds being planted, small ports being provided in the rings used for planting relatively small or light seeds and larger ports being provided in the rings used for planting large and heavy seeds. The size of the suction ports 70 should also be small enough in relation to the kind of seeds being planted so that only one seed will adhere to the inner surface of the ring at the inner end of each suction port and will not become jammed in said port.

The ring shown in Fig. 11 is provided with suction ports 79 which are larger than the suction ports of the previously mentioned rings.

The handle member 35 is fastened to the disk 10 by threaded studs 127 and wing nuts 128. This handle member is also provided with a supporting leg 129 which is hinged thereto as indicated at 130. The leg 129 may be swung to the ground engaging, handle supporting position shown in Fig. 1, or it may be swung to a folded position against the handle and retained in said folded position by engaging the free end of the leg with a suitable retaining clip 131 carried by said handle.

Figure 3:
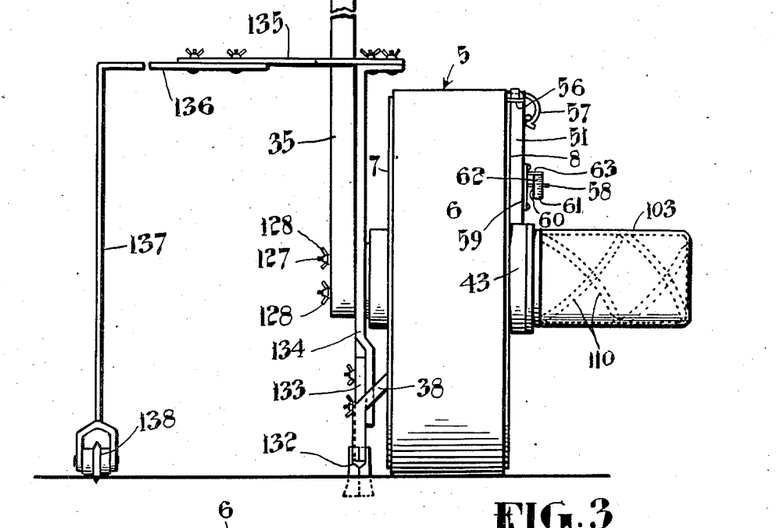
Fig. 3 is a front elevational view of the machine assembly shown in the preceding figures.

The seeds dropped by the delivery spout 38 are deposited in a furrow formed by a suitable furrowing plough 132 which travels in front of the delivery end of the spout. The plough 132 may be mounted in any suitable manner so that it may be adjusted vertically or in any other desired manner. In the present instance (Fig. 3) the plough 132 is shown carried by a vertically extending member 133 which is adjustably secured to a frame member 134 fastened to the disk 10 by the handle securing studs 127 and wing bolts 128.

The upper end of the frame member 134 is fastened to and supports one end of a horizontally extending bar 135, the opposite end of which is adjustably fastened to a horizontal extension 136 provided at the upper end of a vertically extending bar 137 which carries a combined stabilizing and marking roller 138 at the lower end thereof. The furrow formed by the plough 132 is covered by a scraper or other suitable element 139 which is fastened to disk 10 by a spring arm 140 or in any other suitable manner. A trailing roller 141 is arranged rearwardly of the scraper 139 and is also shown fastened to disk 10 by a spring arm 142, although other fastening means may be employed.

Having thus described what I now conceive to be the preferred embodiment of this invention, it will be understood that various modifications may be resorted to within the scope and spirit of the appended claims.

Having thus described my invention, what I claim is:

1. A seed planting machine including a seed pick-up ring which rotates about a horizontal axis during travelling movement of said machine, said ring being provided with suction ports extending from the inner to the outer periphery thereof, means for feeding a mass of seeds onto the inner lower portion of said ring, a source of suction with which the space encircled by said ring is placed in open communication only by those suction parts which, at any given time, are travelling from a position below toward a position above said mass of seeds, the suction created in the last mentioned ports being effective to cause a seed to be drawn against the inner end of each of said ports and to travel upwardly therewith, a seed delivery spout having a seed receiving end positioned within said ring and means whereby the seeds which are separated from said mass of seeds by the last mentioned suction ports are deposited in the said seed receiving end of the delivery spout.

2. A machine as set forth in claim 1, in which the pick-up ring is removably and reversibly mounted and is provided with a plurality of rows of suction ports adapted to be used interchangeably, one or more rows of said ports being put in service when the ring is arranged in one position and the remaining row or rows of parts being put in service when the ring is arranged in a reverse position as compared with said first mentioned position, the suction ports which are put in service when the ring is arranged in said first mentioned position differing in predetermined respect from the suction ports which are put in service when the ring is arranged in said reverse position.

3. A seed planting machine including a suction chamber which rotates about a horizontal axis during travelling movement of said machine, said chamber presenting an inner annular wall encircling said axis, a seed pick-up ring made of flexible and elastic material and provided with suction ports extending from the inner to the outer periphery thereof, said ring being arranged with its outer peripheral surface in pressure contact with said wall, a source of suction connected with said chamber, means for feeding a mass of seeds onto the inner lower portion of said ring, means whereby the space encircled by said ring is placed in open communication with the interior of the suction chamber only by those suction ports which, at any given time, are travelling from a position below toward a position above said mass of seeds, the suction created in the last mentioned ports being effective to cause a seed to be drawn against the inner end of each of said ports and to travel upwardly therewith, a seed delivery spout having a seed receiving end positioned within said ring and means whereby the seeds which are separated from said mass of seeds by the last mentioned suction ports are deposited in the said receiving end of the delivery spout.

4. A seed planting machine as set forth in claim 1, in which the means for feeding a mass of seeds onto the inner lower portion of said ring comprises a container arranged to rotate with said ring and having its mouth portion positioned immediately adjacent one side of said ring, said container being provided with means whereby seeds contained therein are fed toward said ring in response to rotation of said container.

5. A seed planting machine as set forth in claim 1 in which the means for feeding seeds to said ring includes a rotatable ring-shaped container holder encircling said ring and positioned adjacent one side thereof, a container having its mouth portion detachably fitted in and secured to said holder and positioned immediately adjacent said ring, said container being provided with means whereby seeds contained therein are fed onto the inner lower portion of said ring in response to rotation of said container, said ring-shaped holder constituting a means of mounting said container to cause it to rotate with said ring.

6. A seed planting machine as set forth in claim 1 including a ring-shaped suction chamber member within which the seed pick-up ring is fitted so that the outer peripheral surface of the ring is in sealing contact with the inner peripheral wall of said chamber, said chamber member being connected to said source of suction and having an opening in its inner peripheral wall which is placed in open communication with the space bounded by said ring through the agency of those suction ports which, at any given time, are travelling upwardly from a position beneath to a position above said mass of seeds.

7. A seed planting machine including a seed pick-up ring which rotates about a horizontal axis during travelling movement of said machine, said ring being provided with suction ports extending from the inner to the outer periphery thereof, means for feeding a mass of seeds onto the inner lower portion of said ring, a source of suction connected to the outer ends of all of said ports, means for blocking off the inner ends of those ports which, at any given time, are travelling downwardly from a predetermined point above to a predetermined point beneath said mass of seeds, the unblocked suction ports which, at such time, are travelling upwardly between said predetermined points serving to place the space encircled by said ring in open communication with said source of suction, the suction created in each of the last mentioned ports being effective to cause a seed to be drawn against the inner end of each of said ports and to travel upwardly therewith to a position above said mass of seeds, a seed delivery spout having a seed receiving end positioned within said ring and means whereby the seeds which are separated from the mass of seeds and carried upwardly by the last mentioned suction ports are deposited in the said seed receiving end of the delivery spout.

8. A seed planting machine as set forth in claim 7, in which said source of suction is connected to the outer ends of said ports through the medium of a ring-shaped suction chamber in which said ring is fitted so that the outer peripheral surface of the ring bears against the inner peripheral wall of said chamber, the said inner wall of said chamber being provided with a continuous slot opposite the outer ends of said ports.

9. A seed planting machine as set forth in claim 7 in which said source of suction includes a suction box having an air intake opening which is connected to the outer ends of said ports by means including a ring-shaped suction chamber within which the pick-up ring is fitted so that the outer peripheral surface of said ring bears against the inner peripheral wall of said chamber, the said inner peripheral wall of said chamber being provided with an air intake slot positioned opposite the outer ends of said ports and the outer peripheral wall of said chamber being provided with an air outlet opening and air filtering means having an air inlet opening communicating with the air outlet opening of said suction chamber and an air outlet opening communicating with the air intake opening of said suction box.

10. A seed planting machine including a seed pick-up ring which rotates about a horizontal axis during travelling movement of said machine, said ring being provided with suction ports extending from the inner to the outer periphery thereof, means for feeding a mass of seeds onto the inner lower portion of said ring, a source of suction, and air filtering means through which said source of suction is connected to said suction ports to cause seeds to be held against the inner ends thereof, said air filtering means comprising a casing provided with air inlet and outlet openings for the passage of air therethrough, a baffle arranged in said casing to provide a tortuous passage leading from the air inlet to the air outlet opening, and a screen arranged at one side of said baffle and covering the air outlet opening.

11. A seed planting machine as set forth in claim 10 in which the casing of the air filtering means is provided with an automatic air inlet valve which is adjustable to regulate the degree of suction produced in the suction ports by said suction means.

12. A seed planting machine as set forth in claim 7 in which the means for blocking the inner ends of said suction ports comprises a shoe arranged within said ring so that the inner peripheral surface of the ring rotates in contact with said shoe.

13. A seed planting machine comprising a wheel member adapted to be rolled along the ground, said wheel member including a rotating part and a non-rotating part about which the rotating part is mounted to rotate, a seed pick-up ring arranged to rotate with the rotating part of said wheel member and provided with suction ports extending from the inner to the outer periphery thereof, means for feeding a mass of seeds onto the inner lower portion of said ring, a source of suction with which the space bounded by said ring is placed in open communication only by those suction ports which, at any given time, are travelling upwardly from a position beneath to a position above said mass of seeds, a seed delivery spout carried by the non-rotating part of said wheel member and having a seed receiving end thereof positioned within said ring and means whereby the seeds which are separated from the mass of seeds and carried upwardly by the last mentioned suction ports are deposited in the said seed receiving end of the delivery spout.

14. A seed planting machine as set forth in claim 13 in which the outer ends of said suction ports are in continuous communication with said source of suction and in which means are provided for disrupting communication between the space bounded by said ring and the inner ends of those suction ports which, at any given time, are travelling downwardly from a predetermined position above to a predetermined position beneath said mass of seeds.

15. A pneumatic seed planting machine as set forth in claim 1 including a centrifugal air filter which travels around said axis and is provided with a tortuous flow reversing air passage through which the source of suction is connected to the outer ends of the suction ports of said ring, said filter being also provided with troughs located adjacent a bend of said tortuous flow reversing passage so that heavier particles of foreign material entrained by the air stream traversing said passage are thrown outwardly toward said troughs by centrifugal force as the air stream reverses its direction of flow at said bend.

16. A pneumatic seed planting machine comprising a hollow seed pick-up member mounted to rotate about a horizontal axis and provided with suction ports open to the interior thereof, means for rotating said member, means for feeding seeds into the inner space bounded by said member so that said space is partially filled by a mass of seeds in contact with the inner surface of said member, a source of suction with which the space bounded by said member is placed in open communication only by those suction ports which, at any given time, are travelling from a position below to a position above said mass of seeds, the suction created in the last mentioned ports being effective to cause a seed to be drawn against the inner end of each port and to travel upwardly therewith, and means whereby the seeds which are separated from said mass of seeds by the last mentioned suction ports are removed from said member and deposited on the ground.

17. In a seed planting machine of the character described the combination of a rotary suction chamber member presenting an inner annular wall and a seed pick-up ring of flexible and elastic material arranged with its outer peripheral surface in pressure contact with said wall, said wall and ring being provided with suction ports placing the space bounded by the ring in communication with the interior of said chamber member.

18. A seed planting machine as set forth in claim 1, in which the means for feeding a mass of seeds onto the inner lower portion of said ring comprises a transparent container arranged to rotate with said pick-up ring and having its mouth portion positioned immediately adjacent one side of said ring, said container being provided with seed feeding means functioning to feed seeds to said ring in response to rotation of said container.

JOHN M. DODWELL.